(12) United States Patent
Miller et al.

(10) Patent No.: US 7,169,328 B2
(45) Date of Patent: Jan. 30, 2007

(54) MULTIPHASE NANOCOMPOSITE MATERIAL AND METHOD FOR ITS MANUFACTURE

(75) Inventors: John Miller, Ann Arbor, MI (US); Liya Wang, Ann Arbor, MI (US)

(73) Assignee: T/J Technologies, Inc., Ann Arbor, MI (US)

( * ) Notice: Subject to any disclaimer, the term of this patent is extended or adjusted under 35 U.S.C. 154(b) by 0 days.

(21) Appl. No.: 10/759,348

(22) Filed: Jan. 16, 2004

(65) Prior Publication Data

US 2004/0146734 A1  Jul. 29, 2004

Related U.S. Application Data

(60) Provisional application No. 60/440,675, filed on Jan. 17, 2003.

(51) Int. Cl.
- *H01M 4/58* (2006.01)
- *H01M 4/38* (2006.01)
- *C01B 21/00* (2006.01)
- *C01B 33/06* (2006.01)

(52) U.S. Cl. .............. 252/500; 252/518.1; 252/519.1; 429/218.1; 429/209; 429/231.95; 420/557; 420/576; 264/69

(58) Field of Classification Search ............ 252/518.1, 252/519, 500; 429/218.1, 209, 231.95, 219, 429/225, 226, 231.6; 420/557, 576, 129, 420/590; 264/69, 328.6; 428/547, 614

See application file for complete search history.

(56) References Cited

U.S. PATENT DOCUMENTS

| | | | |
|---|---|---|---|
| 5,110,696 A | 5/1992 | Shokooi et al. | 429/218 |
| 5,358,801 A | 10/1994 | Brodd | 429/215 |
| 5,888,669 A | 3/1999 | Thompson, Jr. et al. | 429/218 |
| 6,124,057 A | 9/2000 | Ito et al. | 429/213 |
| 6,203,944 B1 * | 3/2001 | Turner et al. | 429/218.1 |

(Continued)

FOREIGN PATENT DOCUMENTS

JP  WO 00/33402  *  6/2000

(Continued)

OTHER PUBLICATIONS

Weth et al, "The Structure of Carbon Blacks Measured with (Ultra)-Small Angle X-Ray Scattering," J. Porous. Matl., 2001, 8(4), p. 319-325.*

(Continued)

*Primary Examiner*—Mark Kopec
*Assistant Examiner*—Kallambella Vijayakumar
(74) *Attorney, Agent, or Firm*—Gifford, Krass, Groh, Sprinkle, Anderson & Citkowski, P.C.

(57) ABSTRACT

A multiphase composite material having utility as an electrochemical electrode or catalyst includes a first active phase which is an amorphous, electrochemically active material; and a second, stabilizer phase which includes one or more of: metals, carbon, ceramics, and intermetallic compounds. The stabilizer phase is configured as a plurality of spaced apart regions having the active phase disposed therebetween. The active phase may comprise one or more of: Sn, Sb, Bi, Pb, Ag, In, Si, Ge, and Al. The stabilizer phase may include one or more of: Fe, Zr, Ti, and C. Also disclosed are electrodes and batteries which include the material as well as methods for manufacturing the material by using a mechanical alloying process.

15 Claims, 4 Drawing Sheets

U.S. PATENT DOCUMENTS

| | | | |
|---|---|---|---|
| 6,255,017 B1 | 7/2001 | Turner | 429/218.1 |
| 6,436,578 B2 | 8/2002 | Turner et al. | 429/231.95 |
| 6,492,063 B1 * | 12/2002 | Ikeda et al. | 429/231.95 |
| 6,524,744 B1 * | 2/2003 | Clerc et al. | 429/218.1 |
| 6,541,157 B1 * | 4/2003 | Inagaki et al. | 429/231.9 |
| 6,544,687 B1 * | 4/2003 | Sato et al. | 429/218.1 |
| 6,576,207 B1 * | 6/2003 | Mussmann et al. | 423/212 |
| 6,593,030 B2 * | 7/2003 | Bito et al. | 429/218.1 |
| 6,761,998 B2 * | 7/2004 | Sato et al. | 429/231.95 |
| 6,824,921 B2 * | 11/2004 | Sato et al. | 429/218.1 |
| 2004/0062990 A1 * | 4/2004 | Shimamura et al. | 429/218.1 |
| 2005/0031957 A1 * | 2/2005 | Christensen et al. | 429/218.1 |

FOREIGN PATENT DOCUMENTS

JP    WO 01/03210    *    1/2001

OTHER PUBLICATIONS

Yoshimura et al, "Microstructure and Tribological Properties of Nano-Sized Si3N4,", Scripta Mater, 2001, 44, 1517-1521.*

Composite, Hawley's Condensed Chemical Dictionary, 14th Edition, 2002. p. 1.*

* cited by examiner

MULTIPHASE NANOCOMPOSITE MATERIAL AND METHOD FOR ITS MANUFACTURE

RELATED APPLICATION

This patent application claims priority of U.S. Provisional Patent Application Ser. No. 60/440,675 filed Jan. 17, 2003, and entitled "Multiphase Nanocomposite Material and Method for its Manufacture."

FIELD OF THE INVENTION

This invention relates generally to synthetic materials. More specifically, the invention relates to a multiphase nanocomposite material in which an electrochemically active, amorphous material has spaced-apart regions of a stabilizer phase dispersed therein. The invention also relates to electrodes incorporating these materials, and in particular to anodes for rechargeable lithium batteries.

BACKGROUND OF THE INVENTION

Electrochemically active materials function to promote and sustain electrochemical reactions such as those which occur when a battery system is charged or discharged or reactions which otherwise occur when a chemical species is oxidized or reduced at an electrode surface. Likewise, electrochemically active materials can function as catalysts which promote chemical reactions wherein electrons are exchanged between reacting species, either in the presence of an externally applied current or in the absence of such a current. Electrochemically active materials have utility as battery electrodes, fuel cell electrodes, electrochemical sensors, catalysts and the like. The present invention is directed to a novel class of nanocomposite materials which are electrochemically active. As will be described in greater detail hereinbelow, the materials of the present invention have significant utility as battery electrodes, particularly as electrodes for lithium battery systems. The materials of the present invention exhibit very high efficiencies. In addition, they manifest good chemical and mechanical stability when in use. The materials of the present invention are relatively low in cost. Furthermore, the present invention provides particular methods for fabricating the nanocomposite materials. These methods are rapid, low in cost, and readily scalable to produce large volumes of the nanocomposite.

These and other advantages of the present invention will be apparent from the drawings, discussion and description which follow.

BRIEF DESCRIPTION OF THE INVENTION

There is disclosed herein a multiphase composite material which is comprised of a first, active phase which is an amorphous, electrochemically active material, and a second, stabilizer phase which comprises a material selected from the group consisting of: metals, carbon, ceramics, intermetallic compounds, and combinations thereof. The stabilizer phase is configured as a plurality of spaced apart regions having the active phase disposed therebetween. In specific embodiments of the present invention, the active phase comprises, on a weight basis, 30 to 60 percent of the material, and this active phase may include one or more of: Sn, Sb, Bi, Pb, Ag, In, Si, Ge, and Al. In particular embodiments, the active phase includes nanophase domains of the electrochemically active material therein.

In some embodiments, the stabilizer phase includes at least one element selected from the group consisting of: Fe, Zr, Ti, and C. In particular embodiments, the stabilizer phase may comprise one or more of: metal nitrides, metal carbides, metal oxynitrides, metal oxycarbides, and combinations thereof. The stabilizer phase may be amorphous or crystalline, and may be electrochemically active or inactive.

Also disclosed herein are methods for preparing the composite material through the use of mechanical alloying processes. These processes can include ball milling, attritor milling or other grinding processes.

Also disclosed herein are electrodes and batteries fabricated from the composite material.

DETAILED DESCRIPTION OF THE INVENTION

Figure 1:
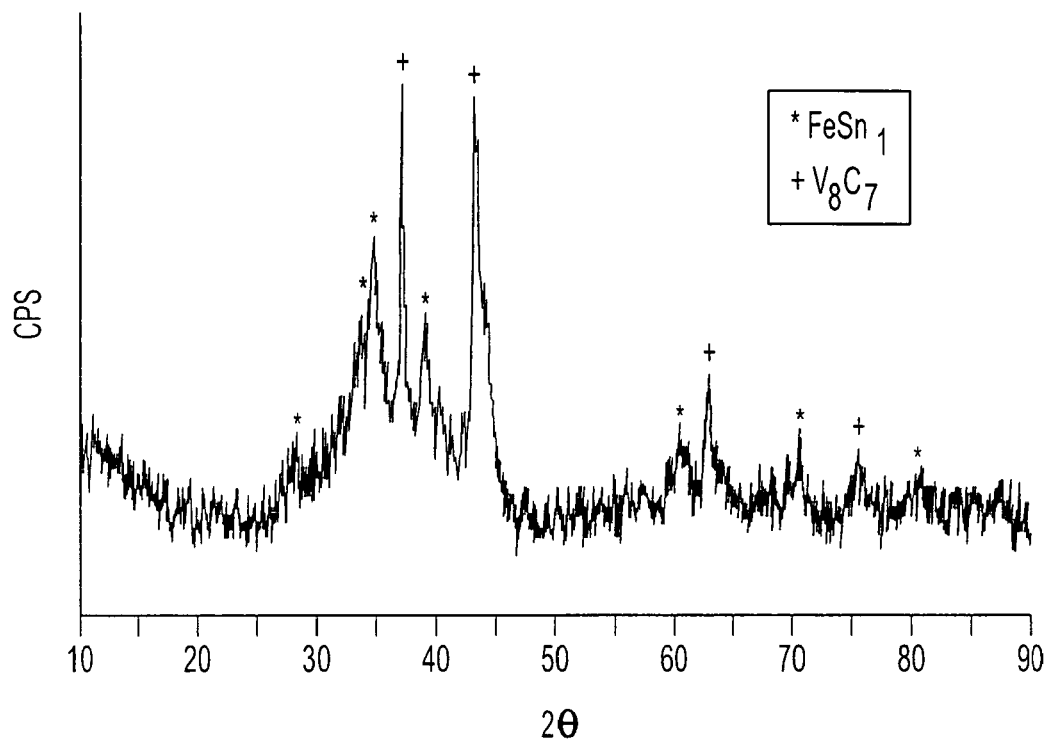
FIG. 1 is an x-ray diffraction pattern for one material of the present invention.

The present invention is directed to nanocomposite materials which are electrochemically active and have utility as electrode materials. In particular, the materials of the present invention may be used, with advantage, as electrode materials for lithium batteries. The materials of the present invention also have utility as catalytic materials when used in connection with other chemical and electrochemical devices. When used as electrodes for lithium batteries, the materials of the present invention exhibit high charge storage, and are very stable in use.

The composite materials of the present invention comprise a novel class of electrochemically active, amorphous materials which are stabilized by a dispersion of a stabilizer material therein. Within the context of this disclosure, an electrochemically active material is understood to be a material which, when employed as a component of an electrode of a lithium battery, exhibits reversible storage and discharge of lithium when the battery is charged and discharged. Within the context of this disclosure, an amorphous material is understood to be a material which is lacking in long-range order, although amorphous materials may have short or intermediate range order or even contain, at times, crystalline inclusions.

In the materials of the present invention, the amorphous, electrochemically active material is stabilized by a stabilizer phase which is dispersed therethrough. The stabilizer phase serves to stabilize the amorphous material through charge and discharge cycles thereby preserving its charge storage capacity. While not wishing to be bound by speculation, the inventors presume that the stabilization may be the result of an interface effect between the surface of the stabilizer material and the electrochemically active material. This effect may be electrical, chemical or thermodynamic. The stabilizer material may also function via physical effects. For example, the stabilizer material may control or accommodate the expansion and contraction of the electrochemically active material during charge and discharge cycles, or it may provide paths whereby the lithium can pass through the bulk of the material.

In a preferred group of materials, the electrochemically active phase of the material comprises, on a weight basis, approximately 30–60% of the bulk material. The electrochemically active amorphous component of the material typically includes one or more of Sn, Sb, Bi, Pb, Ag, In, Si, Ge, and Al. In one embodiment, the amorphous, electrochemically active material is based upon Sn, Si, and/or Al. This material may include yet other elements (including elements which are themselves electrochemically inactive) provided that it remains electrochemically active. Such other elements can function to control the melting point of the amorphous material, aid in retaining its amorphous nature, or otherwise moderate its properties. Zirconium is one example of an element which improves the performance of a tin or silicon based amorphous phase. Zirconium is known to be a glass-forming component of amorphous materials, and it raises the melting point of tin.

The stabilizing material is dispersed throughout the amorphous material in discrete regions, and this stabilizing material is generally comprised of one or more of: ceramics, metals, carbon and metal compounds such as intermetallic compounds. The stabilizer material is usually electrochemically inactive, as defined herein, but in some instances the stabilizer material may make some electrochemical contribution to the function of a battery or other device in which it is incorporated. Typically, the stabilizer material is crystalline, but it may in some instances be amorphous; or, it may be a combination of amorphous and crystalline material. Some ceramic materials having utility as stabilizer materials comprise metal carbides, oxycarbides, borides, oxyborides, nitrides and oxynitrides. In some instances, the stabilizer material may be derived, in part, from the materials comprising the amorphous, electrochemically active component. For example, compounds of iron and tin such as $FeSn_2$ are electrochemically inactive, and can function as stabilizer materials for a tin-based amorphous, electrochemically active species. Zr has been found to function similarly. Other components of the stabilizer material may comprise Ti, C and B.

Based upon x-ray diffraction analyses, it appears that the microstructure of the regions of stabilizer materials can best be described as a metal-matrix composite characterized by nanophase domains having a low degree of crystallinity. The average crystallite size for these regions is approximately 10–30 nm. The active phase appears to be a multi-component metallic glass or amorphous alloy matrix surrounded by the crystallites.

When the materials are used as electrodes for lithium batteries, it is believed that their mechanism of operation comprises the reversible storage of lithium based upon the formation of $Li_xM$ wherein M=Si, Sn, Al, or some other component of the amorphous electrochemically active material, and x is greater than 1. In one instance x has been determined to be approximately 4.4. The amorphous, electrochemically active material may include very small short-range ordered, nanophase domains of the active component M. Furthermore, the expanded nature of the amorphous matrix facilitates passage of Li therethrough which allows it to alloy with the component M in the nanophase domains. While not wishing to be bound by speculation, the inventors hereof presume that this mechanism may be responsible for the very rapid charging and discharging behavior exhibited by electrodes made from these materials as compared to electrodes made from bulk, nonstabilized materials. It is also believed that the high disorder in the amorphous region stabilizes the materials during cycling so as to minimize aggregation of the active component M, which could result in loss of efficiency.

The materials of the present invention may be manufactured by any process which is capable of providing the specific nanostructure thereof. While it is contemplated that vapor deposition methods such as evaporation, sputtering, chemical vapor deposition and the like, as well as thermal processes such as alloying, melt spinning and plasma spray processes, may be employed to manufacture the material of the present invention, one preferred group of manufacturing processes comprise mechanical alloying processes. Mechanical alloying processes employ kinetic energy to cause particle-particle interactions which result in the formation of the nanostructured material of the present invention. Mechanical alloying processes are relatively easy to implement and control, low in cost and amenable to being scaled up to production volumes; hence, such processes are particularly advantageous for use in the present invention.

In a typical mechanical alloying process, components of the material, either in the form of elemental materials, alloys, mixtures, compounds and the like, are subjected to high input levels of kinetic energy which causes particle-particle interactions which produce the structural features of the material and cause the formation of alloys, intermetallic compounds, glassy materials and the like. Among some of the preferred mechanical alloying processes which may be employed in the present invention are grinding processes wherein materials are subjected to high levels of shear and pressure as a result of contact with grinder blades or other such media. Ball milling comprises one type of grinding process wherein materials are charged into a hardened, sealable vessel along with a milling medium comprising balls or pellets of a very hard material such as a ceramic or a hardened metal. The sealed container is rotated or tumbled so as to cause the milling medium and/or walls of the vessel to impact the material charged thereinto. The degree of milling is controlled by controlling the speed at which the vessel is rotated or tumbled; the size, nature and volume of milling medium in the vessel; and the duration of the milling process. An attritor mill comprises one specific variant of ball mill having utility in the present invention. In an attritor mill, a rotor extends into the milling vessel and serves to tumble and stir the milling media. The rotor can be rotated at a very high rate of speed and can impart significant kinetic energy to the materials being milled.

EXAMPLES

Example 1

In a first experimental series, a multiphase nanocomposite material of the present invention having the composition $Sn_4Zr_2Fe_4(VC)_5$ was prepared by a ball milling process in which all of the components of the material were simultaneously processed. The process was carried out a number of times and in each instance, a 10 gram batch of starting material was prepared from 3.97 g Sn (Cerac, −325 mesh), 1.526 g Zr (Cerac, 3–5 micron) 1.896 g Fe (Cerac, −325 mesh) and 26.9 g VC (Cerac, −325 mesh). These materials were thoroughly mixed inside an Ar-filled glove box to a uniform color and texture, after which they were loaded into a hardened steel vial together with alumina milling balls. The mass ratio of balls to material is in the approximate range of 1.5–2:1, and it has been found that the balls may be either 12 millimeters or 6 millimeters in diameter. The vial cap was placed onto the vial and tightened by hand, after which the vials were removed from the glove box and loaded into the clamps of a ball mill of the type described above. The mill was run for 10 hours, continuously, and upon completion of the milling, the vials were transferred back into the glove box and opened. The recovered material was sieved to less than 106 microns, and the typical yield for the foregoing process is generally in the range of 7–9 grams. The resulting product is characterized as a poorly crystallized multiphase material showing x-ray diffraction peaks consistent with the presence of $FeSn_2$ and $V_8C_7$ fractions as shown in FIG. 1 which comprises the x-ray diffraction pattern of the $Sn_4Zr_2Fe_4(VC)_5$ material produced in 10 gram batches as described in Example 1. The notation used to identify the materials in FIG. 1 does not refer to a compound, but rather to the molar content of each component of the compound.

The foregoing procedure was also repeated for 2 gram batches with similar results. In the 2 gram runs, a ball: material ratio of 7:1 was employed with milling times being on the order of 3–5 hours.

Example 2

While in the foregoing example, all of the ingredients of the composition were charged into the mill at one time, the various components could be incorporated in stages. As such, inactive amorphous or crystalline alloys may be formed prior to the addition of the active components. Such a process will have the advantage of minimizing the consumption/solubility of the active phase in an inactive alloy such as $FeSn_2$. For example, it is anticipated that Zr and Fe could be milled together to form an alloy such as $FeZr_2$ or $Fe_2Zr$, prior to the addition of Sn or Si. An extension of this concept would be to include Fe, Zr and VC to form an inactive composite prior to adding the active component. Upon addition of the active component, the materials would be further milled to produce the desired nanocomposite structure. Preferably, between stages, the samples are handled such that exposure to air is minimized, as for example by the use of a glove box.

Example 3

This example refers to substitutional staged alloying of components, and in this example, as in Example 2, the starting components of the material can be added at different times to control the microstructure of the resulting product. This example differs conceptually from Example 2 in that the active component is initially incorporated into the material during the first milling stage. In the second stage, a component is added that will preferentially substitute for the active component in the first stage alloy due to enhanced thermodynamic stability. The active component from the stage one alloy can then be extruded to the grain boundaries of the material or recrystallized during the milling process. This behavior has been observed and confirmed under actual experimental conditions, and the best example of this behavior was observed in the Sn—Zr—Si system. In this experiment, a 2 gram batch of material comprising Sn and Zr was initially milled for three hours in a ball mill, producing a largely amorphous alloy of $Zr_5Sn_3$ (no elemental Sn was observed). In the second stage of the process, Si was added and the milling continued. Samples of the material were taken at various stages during the milling process, and analyzed by x-ray diffraction, and the results thereof are presented in FIG. 2.

Figure 2:
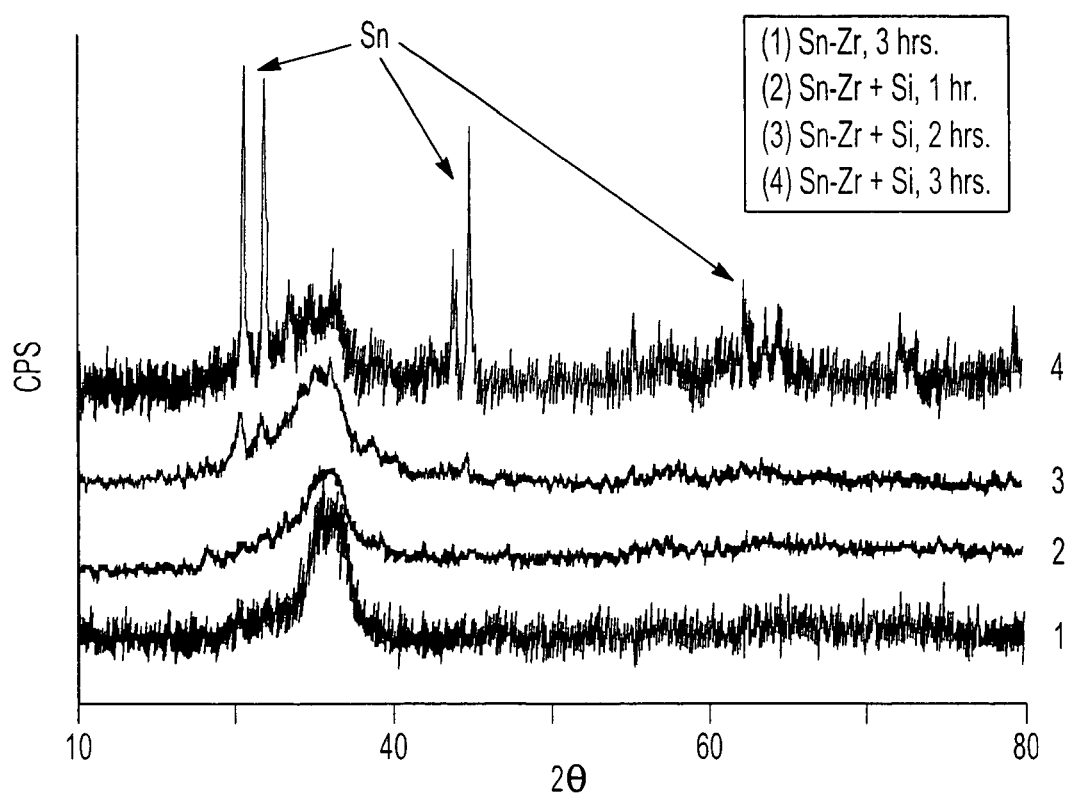
FIG. 2 is a series of electron diffraction patterns for one material of the present invention, taken at various stages in the process for its fabrication.

The first trace in FIG. 2 shows the x-ray diffraction pattern of the as-prepared Sn—Zr material. Trace two shows the material after milling for one hour in the presence of silicon, and as will be seen, this mixture basically comprises the Sn—Zr material with admixed elemental silicon. Trace three shows the result of two hours milling, and it will be noted that peaks indicating the presence of free tin are developing. Trace four shows the result of four hours of milling, and it is clear that upon extended milling, the free Si gradually disappears and is replaced by crystalline $ZrSi_2$ along with the formation of nanocrystalline regions of Sn.

Example 4

While the foregoing examples describe the use of a ball mill in the preparation of materials of the present invention, similar results are obtained utilizing an attritor mill, which provides the additional advantage of being able to process larger batches at higher rates of speed. In this example, an attritor mill was employed to produce a series of materials generally similar to those described in Example 1. In these runs, starting materials were prepared under inert atmosphere conditions as described in Example 1; however, these runs involved batches of approximately 100–200 grams of material. The mass ratio of milling media (balls) to material was approximately 10:1. Once the samples were loaded into the mill, the mechanical alloying process was implemented. Typical milling speeds were in the range of 900–1300 rpm, and in some instances, milling speed was varied during the process, which typically was run for several hours. The resulting product was very similar to that produced in the ball milling process of Example 1, as was verified by x-ray diffraction and electrochemical performance.

It is anticipated that the attritor mill may likewise be employed in connection with the staged alloying processes of Examples 2 and 3, with similar results.

The foregoing examples were all carried out at ambient temperature. However, the alloying process may, in some instances, be carried out at elevated temperatures or at reduced temperatures so as to control the kinetics of the process and/or modify the microstructure of the materials. Temperature control may be achieved by the use of a jacketed milling chamber, an internal or external heater, or any other such means known in the art. Typical low processing temperatures will range down to 0° C., and typical high processing temperatures will range up to 100° C.; however, temperatures outside of these ranges may be employed in certain instances.

Some examples of other compositions of materials prepared in accord with the present invention are set forth in Table 1 hereinbelow.

TABLE 1

| Material | Molar Ratio | | | | Mass Fraction | | | | Mill | Conditions |
|---|---|---|---|---|---|---|---|---|---|---|
| | Sn | M1 | M2 | X | Sn | M1 | M2 | X | | |
| Sn—Zr—Fe—VC | 2.7 | 1.3 | 2.7 | 6 | .331 | .123 | .156 | .390 | Ball | 10 g batch, 16 g balls, 10 hr. mill time |
| Sn—Zr—Fe—TiC | 2 | 1 | 2 | 3 | .383 | .147 | .180 | .290 | Ball | 10 g batch, 16 g balls, 10 hr. mill time |
| Sn—Zr—Fe—TiN | 4.2 | 1.8 | 4.2 | 4 | .435 | .143 | .205 | .216 | Ball | 10 g batch, 16 g balls, 10 hr. mill time |
| Sn—Zr—Si | 2 | 3 | 2 | — | .464 | .536 | .110 | — | Ball | 2 g batch, 16 g balls, 5 hrs. total milling time |
| Sn—Fe—Si | 0.5 | 4 | 7 | — | .125 | .466 | .412 | — | Ball | 2 g batch, 16 g balls, 4 hrs. mill time |
| Zr—Si | — | 3 | 7 | — | — | .418 | .582 | — | Ball | 2 g batch, 16 g balls, 3 hrs. mill time |
| Sn—Zr—Al—Fe-graphite | 2 | 1 | 4 | 0.5 | 0.45 | 0.12 | .042 | 0.01 | Ball | 2 g batch, 16 g balls, 5 hrs. mill time |
| Sn—Zr—Fe—VC | 4 | 2 | 4 | 5 | .397 | .153 | .187 | .263 | Attritor | 100 g batch, 1.5 kg balls, 6 hrs., 1200 rpm |

Figure 3:
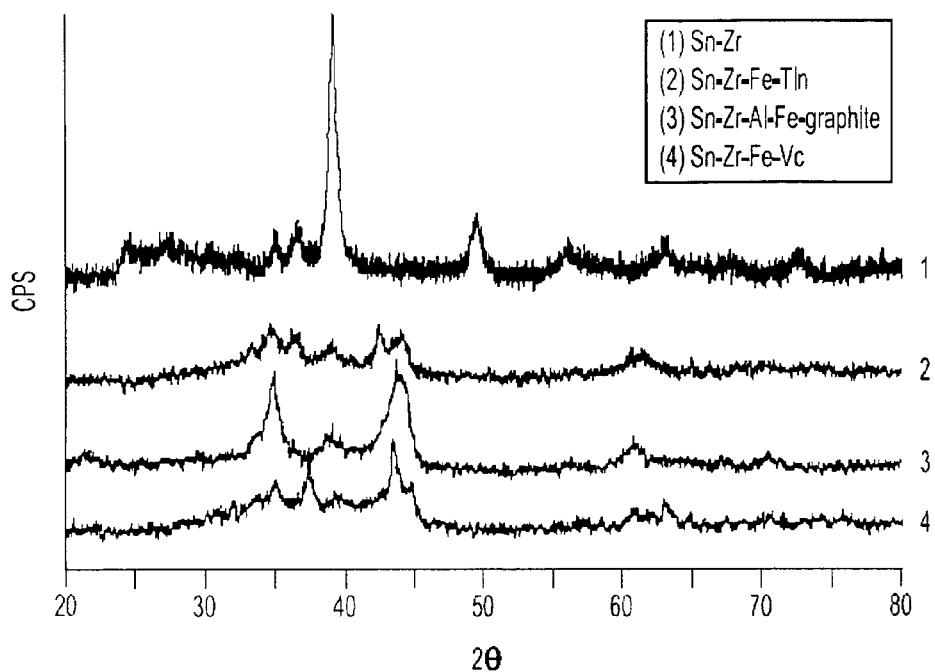
FIG. 3 is a series of x-ray diffraction patterns for a series of four materials in accord with the present invention.

X-ray diffraction analysis was carried out on various materials of Table 1, and the results of this analysis are set forth in FIG. 3. In each instance, the crystalline regions of elemental active component cannot be observed by x-ray diffraction suggesting that the active region is a glassy material or a nanocrystalline material having crystallites of less than 10 nanometers in size.

Figure 4:
FIG. 4 is a scanning electron photomicrograph of a material of the present invention.

Scanning electron microscopy and transmission electron microscopy had been performed on selected nanocomposite materials of the present invention. Scanning electron micrographs show a relatively homogeneous material comprised of agglomerates of particles ranging in size from 1–100 microns in diameter, and FIG. 4 is one such micrograph. Energy dispersive spectroscopy shows that the composition of this material, at this scale, closely approximates the bulk composition of the material. Transmission electron micrographs of the material verify that it includes tin rich nanoscale crystallites embedded in a more amorphous material. The nominal composition of the material is 39.7 weight percent Sn, 15.5 weight percent Zr, 18.9 weight percent Fe and 26.9 weight percent VC; however, the nanocrystalline regions typically include 70–90 weight percent Sn, 1–3 weight percent Zr and 6–10 weight percent Fe.

Electrochemical Evaluation

The materials of the present invention have been found to have very good utility as battery electrodes, and particularly as anodes for lithium ion batteries. In that regard, various of the materials were evaluated in the context of a lithium ion battery. Electrodes of the nanostructured material of the present invention were prepared by mixing the composite electrode powders with conductive carbon (approximately 5–8% by weight of carbon sold under the designation Super P), thereafter 5–12 weight percent of a PVDF binder (polyvinylidene difluoride, Aldrich) was added in a solution of n-methyl pyrrolidinone (Aldrich). The mixture of material, carbon and binder was stirred into a paste consistency and cast onto clean copper foil using the doctor blade draw down method. This electrode material was then cut into individual anodes which were then incorporated into lithium ion batteries.

A typical cell configuration included an anode comprised of the material of the present invention disposed upon a copper backing foil, a separator membrane such as the Celgard® 3501 membrane sold by the Celanese Corporation, and a lithium foil counter electrode. In the thus prepared cells, propylene carbonate was employed as an electrolyte. This is significant since propylene carbonate is not compatible with prior art carbonaceous anode materials due to co-intercalation of the solvent into the carbon electrode material. Propylene carbonate is a desirable electrolyte since it is low in cost and offers improved conductivity at lower temperatures, as compared to electrolytes of the type which must be employed in connection with carbon-based anodes. Typically, small amounts of vinylene carbonate are added to the electrolyte to improve cyclability of the material by creating a stable electrode-electrolyte interface. The thus prepared battery stacks are sealed into a battery container which may comprise a stainless steel can or a laminate pouch, as is known in the art.

Figure 5:
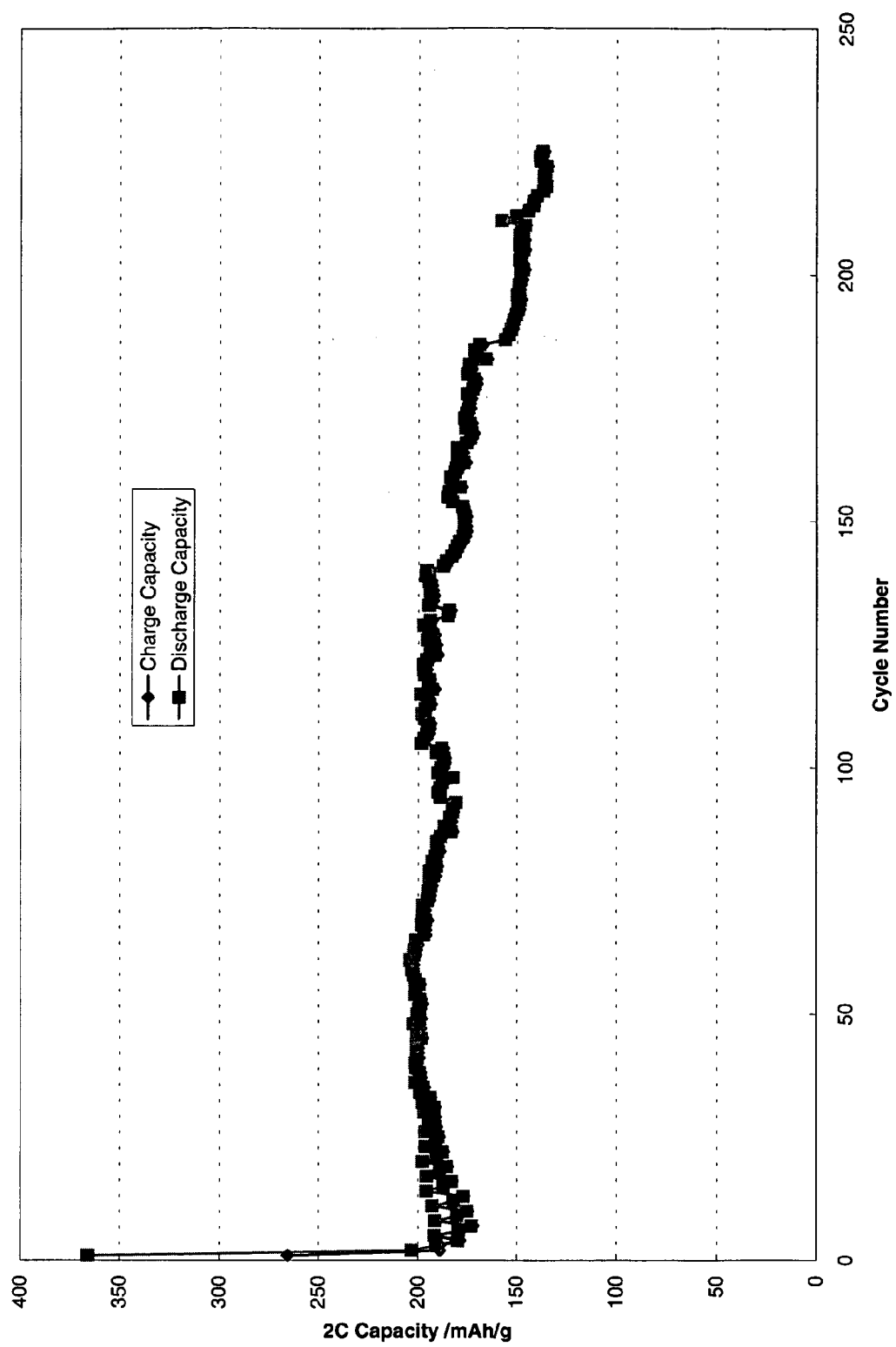
FIG. 5 is a graph illustrating the extended cycling characteristics of a battery which includes an anode comprised of a material of the present invention.

The thus prepared batteries were tested by constant current charge discharge cycling between 1.2 volts and 0.05 volts vs. Li. The current range is typically set to achieve a single charge or discharge step in approximately 2 hours (i.e. C/2), but is tested at both higher and lower currents. FIG. 5 shows the extended cycling characteristics of a battery including an anode of the present invention having the nominal composition $SnZr_{0.5}Fe(VC)_{1.25}$. As will be seen, the data points for the charge and discharge capacity are essentially coincident. This is indicative of the fact that the anode material has a high coulometric efficiency, that is to say one gets back essentially all of the charge that is stored in the material. Since the material of the present invention is very high in density, it manifests a very high capacity per unit volume, and in an actual compressed electrode format capacities in the range of 900 $mAh/cm^3$ have been achieved, and this value is approximately double that which is achieved by prior art carbon-based electrodes.

Figure 6:
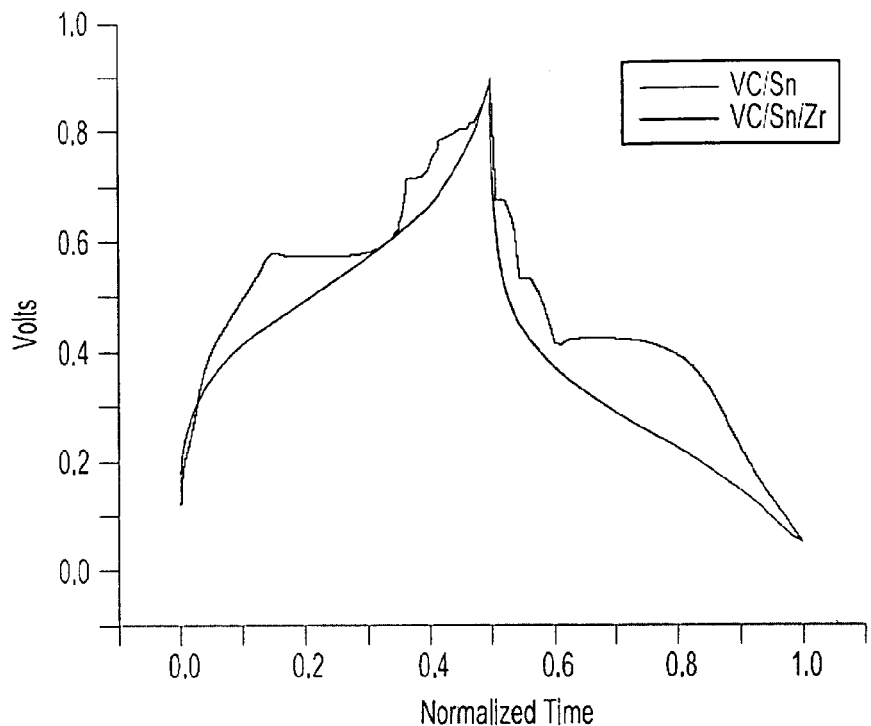
FIG. 6 is a graph showing the electrochemical voltage versus time profile comparing the characteristics of a material of the present invention with a prior art material.

The materials of the present invention provide a very high dispersion of the active component within a matrix, and this high dispersion has a stabilizing effect upon the material that minimizes degradation due to expansion and contraction of the active phase upon lithiation and delithiation. This mechanical stability of the material provides a very good cycle life as compared to prior art materials. FIG. 6 is a graphic representation of the electrochemical voltage versus time profile for a material of the present invention, namely VC/Sn/Zr, as compared to a prior art material, namely VC/Sn. This graph shows normalized time versus volts for both materials, and as will be seen, the voltage versus time profile for the prior art material shows a number of sharp breaks which are believed to correspond to phase transitions, while the material of the present invention demonstrates a very smooth charge-discharge curve. These curves have been time normalized to directly compare the profile shape, and it should be noted that the actual capacity of the prior art sample is generally somewhat higher than that of the present invention; however, this material is undesirable, since it typically degrades within 20 cycles, while the material of the present invention has very good long term stability.

Figure 7:
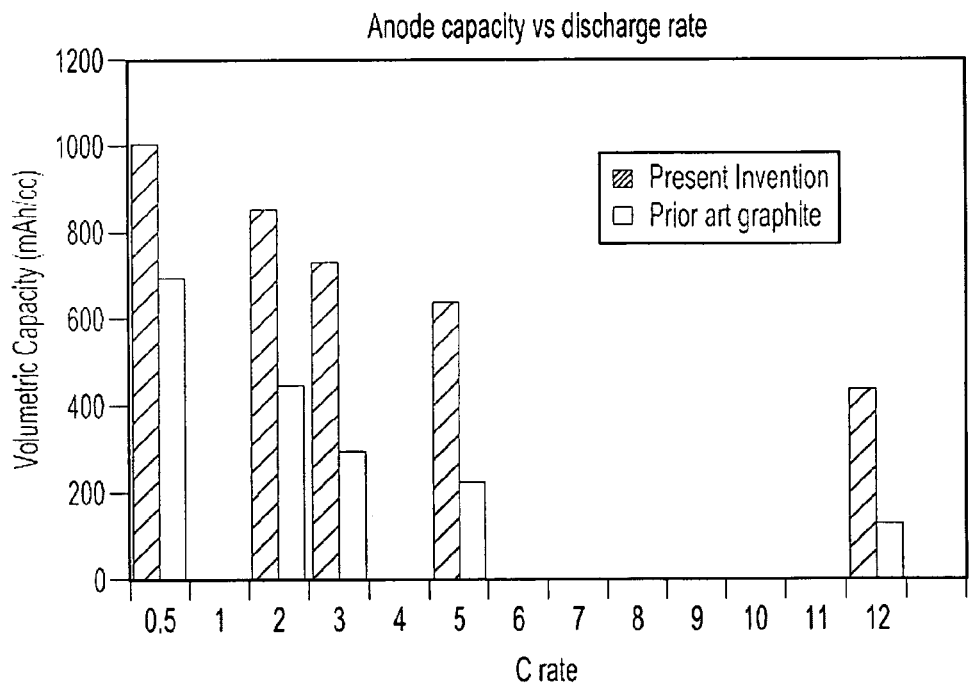
FIG. 7 is a graph comparing the rate capability of anodes incorporating materials of the present invention with prior art graphite anode materials.

In addition to showing good cycling characteristics and high volumetric capacity, the materials of the present invention also show excellent rate capability and low T performance as is demonstrated in FIG. 7. FIG. 7 compares the rate capability of anodes of the present invention and prior art graphite anodes and depicts the volumetric capacity of the anodes as a function of charging rate. As will be seen, the materials of the present invention are capable of being charged at very high rates.

Batteries incorporating the anode materials of the present invention also exhibit excellent low temperature performance and stability. In this regard, a lithium battery was prepared as described hereinabove utilizing an anode material comprising $SnZr_{0.5}Fe(VC)_{1.25}$. The battery utilized 1.0 M $LiPF_6$ in a 2:1:1 propylene carbonate/DMC/EMC solvent. The cell was cycled at a temperature of −40° C., and its charge capacity was stable at approximately 100 mAh/g over 35 cycles, at which time the experiment was terminated.

The present invention provides a novel nanocomposite material having significant utility as an electrode material for batteries, particularly as an anode material for lithium batteries. As demonstrated hereinabove, the material of the present invention allows for the manufacture of batteries which have very high charge storage capabilities, and which are capable of being charged and discharged at relatively high rates. The batteries of the present invention have stable charge and discharge characteristics, and very good low temperature operational characteristics. While the materials of the present invention have been generally described with reference to their use in batteries, it is to be understood that these materials also have utility in any other electrochemical and non-electrochemical application in which a stable, highly active nanocomposite material is required. As such, these materials will have utility as electrodes and other current carrying devices as well as having utility as catalysts and the like. While certain materials and methods have been disclosed herein, it is to be understood that such disclosure was for purposes of illustration and not limitation. Various other materials, methods for their fabrication and utilities will be readily apparent to one of skill in the art. It is the following claims, including all equivalents, which define the scope of the invention.

The invention claimed is:

1. An electrode comprising:
a multiphase composite material, said multiphase composite material comprising: a first, active, phase comprising an amorphous, electrochemically active material including nanophase domains of a material selected from the group consisting of: Sn, Sb, Bi, Pb, Ag, In, Si, Ge, Al, and combinations thereof; and a second, stabilizer, phase comprising a ceramic, said stabilizer phase being configured as a plurality of spaced apart regions having said active phase interspersed therebetween, said stabilizer phase being electrochemically active.

2. The electrode of claim 1, wherein said stabilizer phase includes at least one element selected from the group consisting of: Fe, Zr, Ti, and C.

3. The electrode of claim 1, wherein said stabilizer phase comprises a member selected from the group consisting of: metal nitrides, metal carbides, metal oxynitrides, metal oxycarbides, and combinations thereof.

4. The electrode of claim 1, wherein said spaced apart regions of said stabilizer phase have a size in the range of 10–100 nanometers.

5. A method of making a multiphase composite material, said method comprising the steps of:
providing a plurality of components, said components including the elements of which said multiphase composite material is comprised; and
subjecting said plurality of components to a mechanical alloying process wherein said mechanical alloying process comprises a staged process wherein a first portion of said plurality of components are subjected to a first mechanical alloying process so as to produce a first component of said multiphase composite material, and a second portion of said components are subsequently subjected to a second mechanical alloying process with said component; whereby said multiphase composite material is formed.

6. A method of making a multiphase composite material, said method comprising the steps of:
providing a plurality of components, said components including the elements of which said multiphase composite material is comprised; and
subjecting said plurality of components to a mechanical alloying process which is a substitutional process wherein, in a first step, a first composition which includes a first and second element of said multiphase composite material is subjected to a mechanical alloying process along with a third composition which is comprised of a third element and a fourth element of said multiphase composite material, wherein said third element displaces said second element from said first composition so as to form a second composition which includes said first and third element.

7. A multiphase, composite material comprising:
a first, electrochemically active phase including amorphous, nanophase domains of tin or silicon therein; and
a second, stabilizer phase comprising an electrochemically active material selected from the group consisting of metal nitrides, metal carbides, metal oxynitrides, metal oxycarbides, and combinations thereof, said stabilizer phase comprising a matrix configured as a plurality of spaced apart regions having said first phase interspersed therebetween.

8. The material of claim 7, wherein said active phase comprises, on a weight basis, 30–60% of said material.

9. The material of claim 7, wherein said nanophase domains have a size in the range of 10–30 nanometers.

10. The material of claim 7, wherein said stabilizer phase comprises an amorphous material.

11. The material of claim 7, wherein said stabilizer phase comprises a crystalline material.

12. The material of claim 7, wherein said material is prepared by a mechanical alloying process.

13. The material of claim 12, wherein said mechanical alloying process is a ball milling process.

14. The material of claim 12, wherein said mechanical alloying process is an attritor milling process.

15. The material of claim 12, wherein said mechanical alloying process is a grinding process.

* * * * *

UNITED STATES PATENT AND TRADEMARK OFFICE
CERTIFICATE OF CORRECTION

| | | |
|---|---|---|
| PATENT NO. | : 7,169,328 B2 | Page 1 of 1 |
| APPLICATION NO. | : 10/759348 | |
| DATED | : January 30, 2007 | |
| INVENTOR(S) | : John Miller et al. | |

It is certified that error appears in the above-identified patent and that said Letters Patent is hereby corrected as shown below:

Column 10, line 37, after "said" first occurrence; insert --first--

Signed and Sealed this

Fifth Day of June, 2007

JON W. DUDAS
*Director of the United States Patent and Trademark Office*